United States Patent [19]

Randlett et al.

[11] Patent Number: 5,348,213
[45] Date of Patent: Sep. 20, 1994

[54] METHOD FOR THE MANUFACTURE OF INTERNALLY ENHANCED WELDED TUBING

[75] Inventors: Myron R. Randlett; Jerome M. Dupy, both of Cuba, Mo.

[73] Assignee: Olin Corporation, Cuba, Mo.

[21] Appl. No.: 997,387

[22] Filed: Dec. 28, 1992

[51] Int. Cl.⁵ ............................................. B23K 33/00
[52] U.S. Cl. ................................. 228/146; 228/173.3; 72/368; 219/61.3; 29/890.053
[58] Field of Search ............ 228/146, 147, 166, 173.3, 228/171; 72/368, 52; 219/61.11, 61.13, 61.3; 29/890.049, 890.05, 890.053, 890.054; 492/30

[56] References Cited

U.S. PATENT DOCUMENTS

| | | | |
|---|---|---|---|
| 1,872,276 | 8/1932 | Graham | 72/368 |
| 2,352,306 | 6/1944 | Anderson. | |
| 3,700,158 | 10/1972 | Schatz et al. | |
| 3,861,462 | 1/1975 | McLain. | |
| 3,885,622 | 5/1975 | McLain. | |
| 3,901,430 | 8/1975 | McLain | 228/146 |
| 3,906,605 | 9/1975 | McLain. | |
| 3,911,710 | 10/1975 | Gest. | |
| 3,938,724 | 2/1976 | Nakamura et al. | |
| 4,025,749 | 5/1977 | Spurr et al. | |
| 4,493,962 | 1/1985 | Weil et al. | |
| 4,568,015 | 2/1986 | Toyooka et al. | 219/8.5 |
| 4,697,446 | 10/1987 | Yamamoto et al. | |
| 4,830,258 | 5/1989 | Lentz et al. | |
| 4,866,830 | 9/1989 | Zohler. | |
| 4,905,885 | 3/1990 | Hellman, Sr. | |
| 4,995,549 | 2/1991 | Hellman, Sr. | |
| 5,052,476 | 10/1991 | Sukumoda et al. | |

FOREIGN PATENT DOCUMENTS

| | | | |
|---|---|---|---|
| 1288547 | 2/1969 | Fed. Rep. of Germany. | |
| 55-30306 | 3/1980 | Japan | 228/166 |
| 60-3984 | 1/1985 | Japan | 219/61.3 |
| 2-108411 | 4/1990 | Japan | 29/890.049 |
| 1006138 | 3/1983 | U.S.S.R. | 228/171 |

Primary Examiner—P. Austin Bradley
Assistant Examiner—Jeanne M. Elpel
Attorney, Agent, or Firm—Gregory S. Rosenblatt

[57] ABSTRACT

There is provided a method for the manufacture of a welded tube having an enhanced inner wall. A fin insert shapes the edges of a metallic strip prior to welding and minimizes the formation of a weld bead inside the tube. The portion of the edge of the metallic strip adjacent the outer surface of the tube is formed to a first angle, while that portion of the edge adjacent an inner wall of the tube is formed to a second, lesser angle.

7 Claims, 5 Drawing Sheets

METHOD FOR THE MANUFACTURE OF INTERNALLY ENHANCED WELDED TUBING

FIELD OF THE INVENTION

This invention relates to an apparatus and method for the manufacture of an internally enhanced welded heat exchange tube. More particularly, the invention relates to a means to shape the edges of a strip to minimize the formation of an internal weld bead.

BACKGROUND OF THE INVENTION

Metallic strip is formed into tubing by passing the strip through forming rolls which deform the strip into an open ellipse with the opposing transverse edges of the strip in close proximity. The strip then passes through a welding station which bonds the transverse edges forming a tube.

Subsequent to welding, the tube typically passes through at least one set of sizing rolls to transform the elliptical tube to a generally circular configuration. The means and apparatus for converting strip to welded tubing is disclosed in U.S. Pat. Nos. 3,700,158 to Schatz et al, 4,697,446 to Yamamoto et al and 4,905,885 to Hellman, Sr., all of which are incorporated in their entirety by reference herein.

It is desirable to enhance the inner wall of the tube by providing a textured surface to increase surface area. The increased surface area increases the transfer of the heat from a liquid flowing within the tube to an external heat sink. A variety of enhancement patterns are known to enhance the performance of a heat exchange tube. The patterns include corrugated ridges or diamonds as disclosed in U.S. Pat. No. 3,861,462 to McLain and pear shaped grooves as disclosed in U.S. Pat. No. 5,052,476 to Sukumoda et al both of which are incorporated in their entireties by reference herein.

One problem in the manufacture of welded tube is an extruded weld bead. Excess welding material flows from the weld and accumulates on the inner and outer walls of the tube. Removal of the bead generally involves removal of some base material. While the removal of base material is acceptable from nonenhanced (smooth) tube walls, removal from an enhanced surface results in damage to the enhancement pattern in the weld region.

One method to remove the weld bead, used primarily in the manufacture of steel tube, is disclosed in U.S. Pat. No. 2,352,306. An oxygen jet is directed against the weld bead soon after welding when the bead is still hot. The bead ignites resulting in a smooth weld seam. U.S. Pat. No. 4,905,885 discloses a hydraulically controlled bead reduction roller and a backing roller to flatten the weld bead. Another method is the insertion of an internal cutting tool.

When the inner wall of the tube is enhanced, the prior art methods of removing the weld bead are unsatisfactory. Mechanical flattening would damage the enhancement. A stream of oxygen would be deflected by the enhancements and inadequately ignite the weld bead. Cutting destroys a portion of the enhancement pattern.

SUMMARY OF THE INVENTION

Accordingly, it is an object of the invention to provide both an apparatus and a method for the manufacture of welded tube without a weld bead from metallic strip. It is a feature of the invention that the angle of the strip edges is shaped by a fin insert to a specific angle minimizing or preventing the formation of a weld bead.

Among the advantages of the invention are that the apparatus and method are useful for both enhanced and smooth inner wall tubing. Weld bead formation is minimized, removing the need for a weld bead removal step, simplifying the tube forming process and reducing cost.

In accordance with the invention, there is provided a fin insert for the manufacture of welded tube from metallic strip. The fin insert has a first portion with a positive angle relative to the axis of the fin insert and a second portion with a second angle relative to the axis of the fin insert. The second angle is less than said first angle.

The above-stated objects, features and advantages will become more apparent from the specification and drawings which follow.

DETAILED DESCRIPTION OF THE INVENTION

Figure 1:
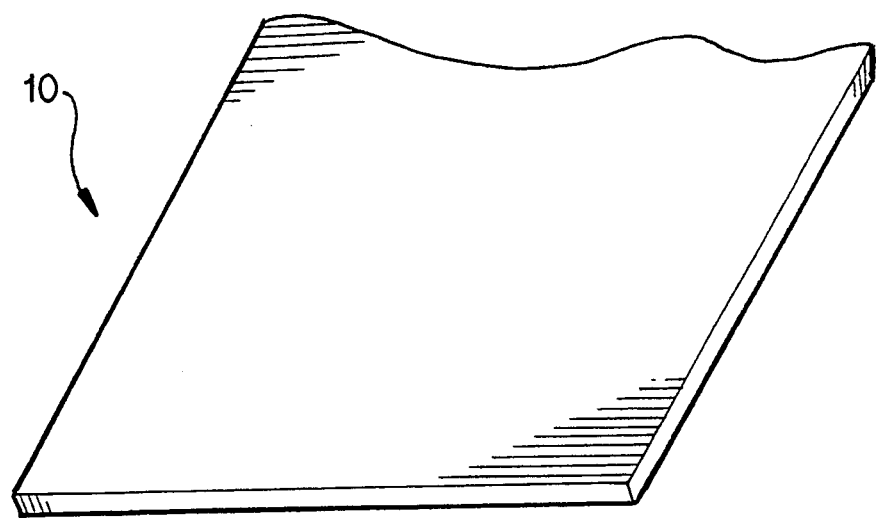
FIG. 1 shows in isometric view a metallic strip for the manufacture of welded tube as known from the prior art.

FIG. 1 shows in isometric view a metallic strip 10 used in the manufacture of welded tube as known from the prior art. The metallic strip 10 has a width about equal to or slightly larger than the circumference of the desired tube. The thickness of the metallic strip 10 is about equal to or slightly larger than the desired thickness of the tube. The metallic strip 10 can be formed from any metal or metallic alloy suitable for welding. For heat exchange applications, the tubing is typically a copper base alloy, an aluminum base alloy, a stainless steel or titanium.

Figure 2:
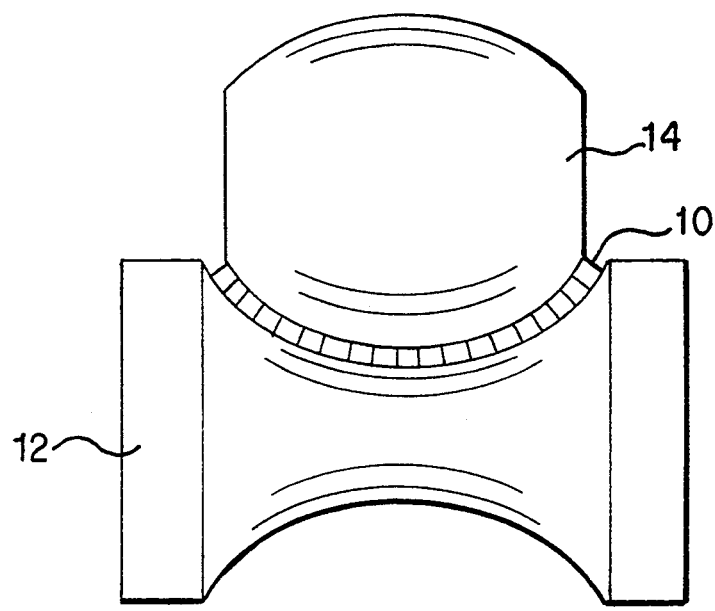
FIG. 2 shows in partial isometric view, a pair of forming rolls used to shape a metallic strip into a tube as known from the prior art.

The metallic strip 10 is formed into an arcuate shape by passing through forming rolls as illustrated in FIG. 2 and known from the prior art. The forming rolls usually consist of a first forming roll 12 having a concave shape for defining the external radius of the metallic strip 10. A second forming roll 14 having a convex shape, defines the inside radius of the metallic strip 10.

Figure 3:
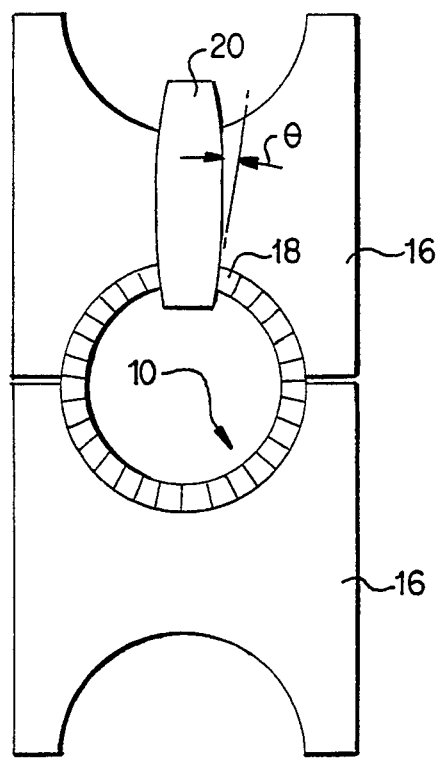
FIG. 3 shows in partial isometric view, a fin insert as known from the prior art.

A series of forming rolls transform the metallic strip to an open ellipse as illustrated in FIG. 3 and known from the prior art. The edges 18 of the metallic strip 10 are aligned and brought in close proximity by forming rolls 16. Associated with forming rolls 16 is a fin insert 20. The fin insert shapes the edges to provide a consistent well bead. The fin insert 20 provides the edges 18 of the metallic strip 10 with a desired angle "$\theta$". $\theta$ is conventionally on the order of from 0° to about 15° and, typically on the order of about 12°.

Figure 4:
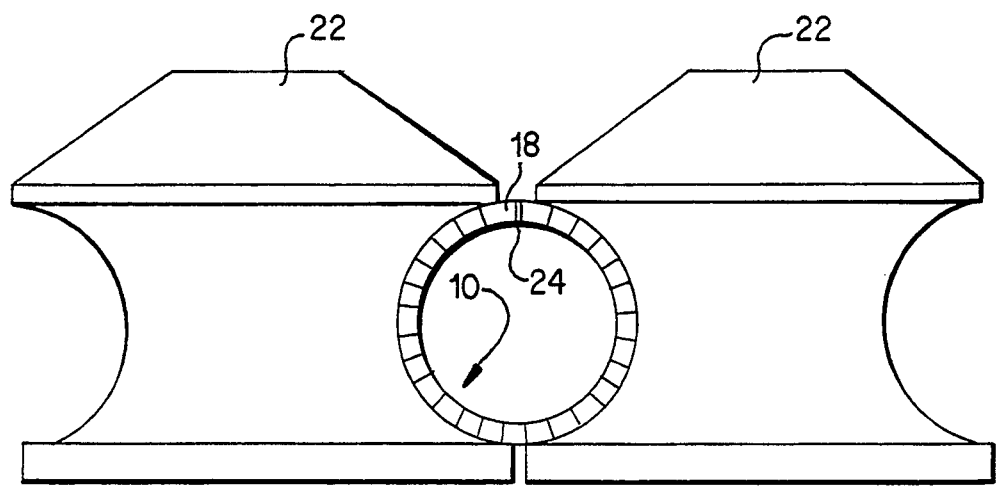
FIG. 4 shows in partial isometric view, a pair of high frequency welding rolls as known from the prior art.

Following shaping of the edges 18 of the metallic strip 10, the edges are brought together by welding rolls 22 illustrated in FIG. 4 and known from the prior art. The edges 18 are heated to the melting temperature by either high frequency induction or resistance type heating. The welding rolls 22 cause the edges 18 to contact one another. The molten edges fuse forming a weld 24. Excess molten metal is extruded from the weld and accumulates as a bead on both the inner and outer walls of the tube.

One or more sets of sizing rolls (not shown) may follow the welding rolls to ensure transformation of the welded tube from an elliptical to a round.

Figure 5:
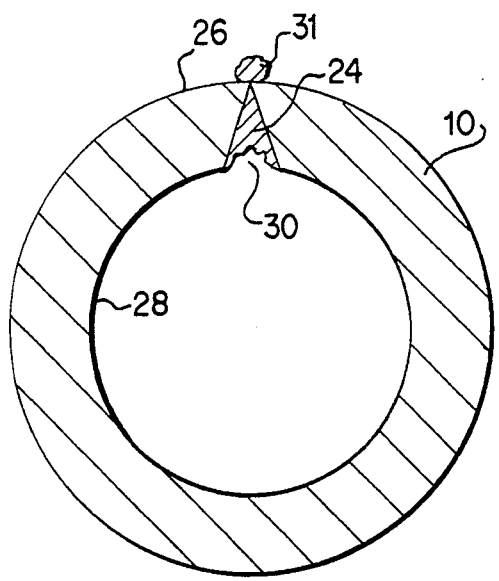
FIG. 5 shows in cross-sectional representation, a welded tube in which the fin insert angle was zero.

The angle $\theta$ of the fin insert influences the weld 24. FIG. 5 shows a weld from a fin insert having an angle of 0°. The weld adjacent the outer wall 26 of the tube is solid and forms a good bond. The weld adjacent the inner wall 28 is incomplete. A weld free zone 30 creates a depression in the inner wall of the welded tube. The depression weakens the weld and can cause turbulent flow in a liquid passing through the tube. Excess metal is extruded outward from the weld forming a weld bead 31 on the outer wall 26 of the tube.

Figure 6:
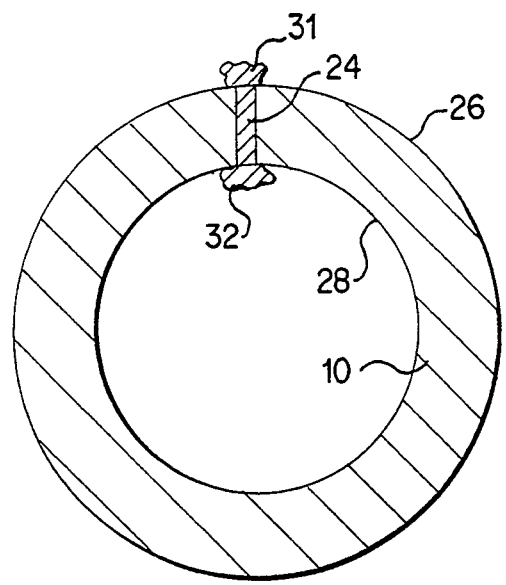
FIG. 6 shows in cross-sectional representation, a welded tube in which the fin insert was approximately 12°.

When the angle of the fin insert is about 12°, a weld 24 as illustrated in FIG. 6 is achieved. The weld 24 is consistent from the outer wall 26 through to the inner wall 28 of the tube. Weld beads 31,32 extend from both the inner and outer walls of the tube. Bead 31 is removed by conventional means such as scarfing. The bead 32 must be removed to avoid turbulent flow of a liquid passing through the heat exchange tube. When the inside surface 28 of the welded tube is smooth and the inside diameter of the tube is large, greater than about 8.25 mm (0.325 inches) removal of the bead 32 is not difficult. A mandrel or other machining device is passed through the inside bore to either flatten the bead or remove it by scarfing.

While conventional means will remove the bead 32 from large diameter welded tubes having a smooth internal bore, when the inner wall 28 is enhanced removal of the bead is difficult without removal of a portion of the enhancement. It is preferred to avoid the formation of a bead 32 by directing excess metal to the outer wall 26 of the welded tube.

Figure 7:
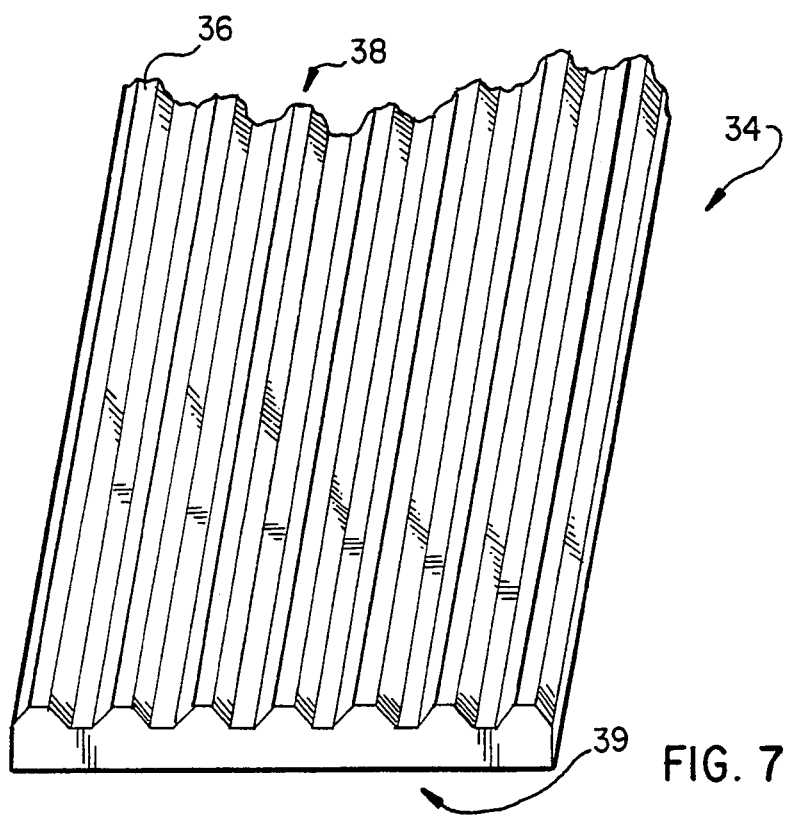
FIG. 7 shows in isometric view, a corrugated metallic strip to form welded tube having an internally enhanced surface.

FIG. 7 shows in isometric view a corrugated metallic strip 34 for forming an internally enhanced welded tube. The corrugated ridges 36 can be formed by milling, scarfing or another subtractive processes or by roll forming. In roll forming, a metallic strip is passed through a pair of rolls, at least one of which is textured to imprint a desired pattern on a surface of the strip. The corrugated metallic strip 34 illustrated in FIG. 7 has a textured surface 38 and a smooth surface 39. During roll forming, the corrugated metallic strip 34 is deformed into a tubular shape with the textured surface 38 forming the inner wall.

Figure 8:
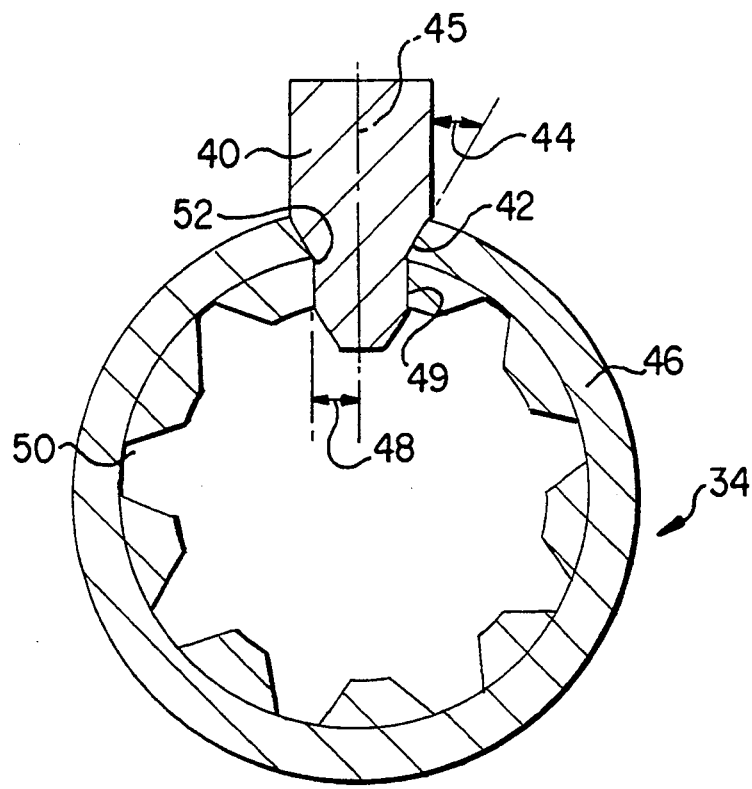
FIG. 8 shows in cross-sectional representation, a fin insert in accordance with a first embodiment of the invention.

FIG. 8 illustrates in cross-sectional representation a fin insert 40 in accordance with a first embodiment of the invention. The fin insert 40 imparts two separate angles on the edges of the corrugated metallic strip 34. The fin insert has a first portion forming a first angle 44 relative to the axis 45 of the fin insert. The first angle 44 is any value greater than zero. Preferably, the first angle is from about 6° to about 18° and most preferably from about 10°-15°. The first angle shapes substantially that portion 46 of the corrugated strip which is not corrugated.

A second angle 48 is defined by a second portion and the axis of the fin insert 40. The second angle shapes the edges 49 of the corrugated portion 50 of the strip. The second angle 48 is less than the first angle 44. Preferably, the second angle 48 is less than about 5° and most preferably, the second angle 48 is approximately 0°.

The first angle 44 shapes the edges 42 of the uncorrugated portion 46 of the corrugated strip 34 and the second angle 48 shapes the edges 49 of the corrugated portion 50 of the strip. It is not necessary for the inflection point 52 to be at the intersection of the corrugated portion and the uncorrugated portion. Preferably, the first angle 44 shapes from about 20% to about 100% of the uncorrugated portion of the strip. More preferably, the first angle 44 shapes from about 60% to about 100% of the uncorrugated portion. Similarly, the second angle should preferably shape from about 20% to about 100% of the corrugated portion of the strip and preferably from about 75% to about 100% of the corrugated portion.

Figure 9:
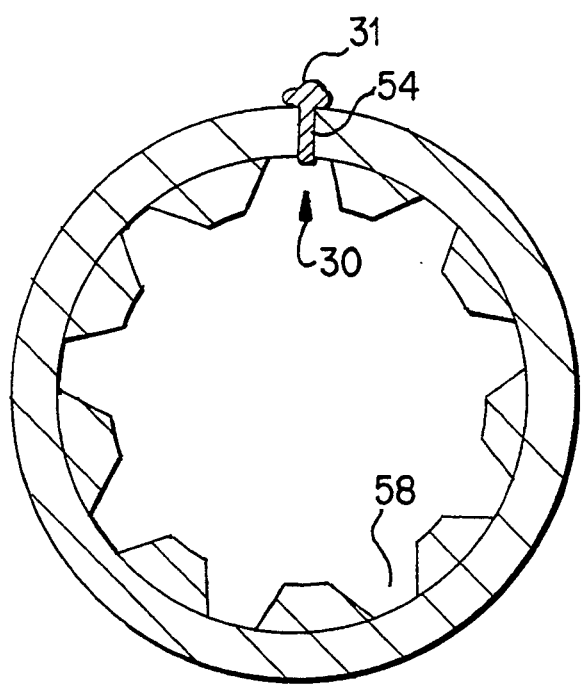
FIG. 9 shows in cross-sectional representation, the weld achieved with the fin insert of FIG. 8.

FIG. 9 illustrates in cross-sectional representation the weld 54 formed from the fin insert 40. The weld 54 forms a consistent solid weld throughout the uncorrugated portion and a small weld free zone 30 in the corrugated portion. The weld 54 does not form an internal bead to interfere with the flow of liquid through the tube. The weld free zone 30 is smaller than the grooves 58 of the corrugated surface so the effect on flow is minimal. The external bead 31 is easily removed without damage to the enhancement pattern.

Figure 10:
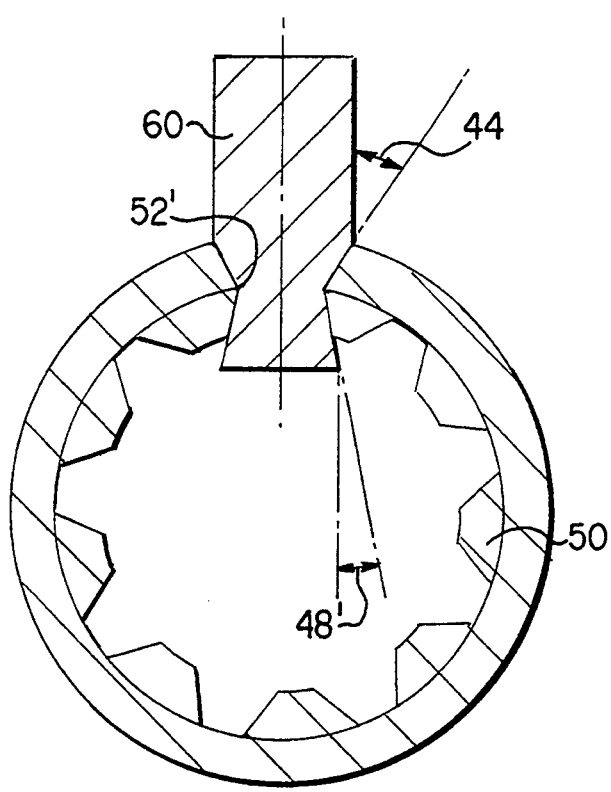
FIG. 10 shows in cross-sectional representation, a fin insert in accordance with a second embodiment of the invention.

FIG. 10 shows a fin insert 60 in accordance with a second embodiment of the invention. The fin insert 60 has a first angle 44 having a positive value similar to that of the preceding embodiment. The second angle 48' is any angle less than zero. Preferably, the second angle is from about 0° to about −10° and most preferably, from about −1° to about −5°. An inflection zone 52' in the region where the corrugated grooves 58 terminate, converts the fin insert from the positive first angle 44 to the negative second angle 48' with a small zero degree region. Preferably, this zero degree region has a length of from about 10% to about 30% of the thickness of the nonenhanced portion of the base metal.

Figure 11:
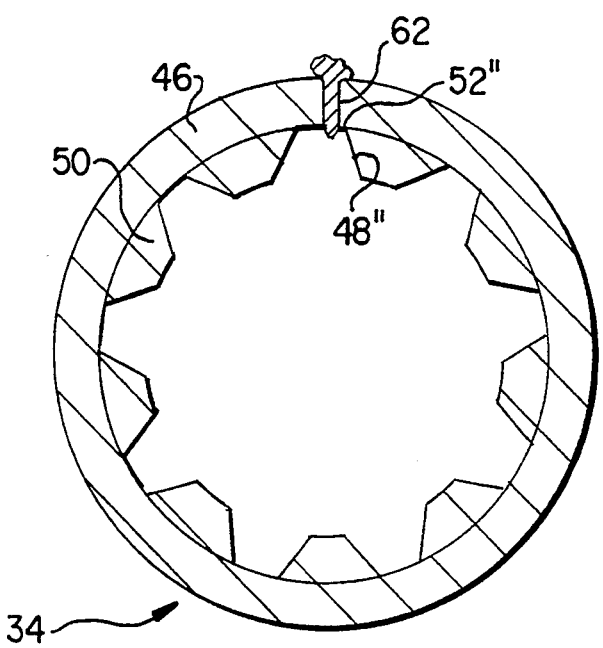
FIG. 11 shows in cross-sectional representation, the weld bead achieved with the fin insert of FIG. 10.

As shown in cross-sectional representation in FIG. 11, the positive first angle produces a solid weld bead 62 in the uncorrugated portion 46 of the metallic strip 34. The negative second angle forces the weld material out of the corrugated region such that the weld tapers off in the inflection zone 52" and there is no weld in the second angle zone 48" of the corrugated portion 50. The edge of the corrugated strip 34 may be formed to terminate at a corrugation, the use of the fin insert produces a weld 62 with a very minimal effect on the corrugations. A fluid flowing through the welded tube of the second embodiment is exposed to a consistent surface with minimal protrusions from a weld bead or unwelded zone. No processing is required to remove an inner weld bead.

While the invention has been described in terms of welded tube having an internally enhanced surface, it is equally applicable to welded tubes having both internally and externally enhanced surfaces. Further, the fin insert configurations of the invention are particularly suited for small bore welded tubes from which removal of a bead would be difficult.

It is apparent that there has been provided in accordance with this invention, a method for forming internally enhanced welded tubing which fully satisfies the objects, means and advantages set forth hereinabove. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A method for the manufacture of a heat exchange tube formed from a metallic strip having opposing first and second surfaces and opposing longitudinal edges joined by a longitudinally running weld bead, comprising the steps of:
    a) forming a pattern on said second surface of said metallic strip;
    b) forming said metallic strip into an ellipse with said second surface forming an inner wall;
    c) shaping, with a fin insert, the opposing longitudinal edges of said metallic strip to:
        (i) a first angle adjacent said first surface,
        (ii) a second angle adjacent said second surface, said first angle and said second angle being measured relative to a center line axis which runs perpendicular to said longitudinally running weld bead, and
        (iii) an inflection zone connecting said first angle and said second angle wherein said inflection zone is closer to said center line axis than said shaped opposing longitudinally edges;
    d) contacting said shaped opposing longitudinal edges of said metallic strip; and
    e) welding said shaped opposing longitudinal edges together.

2. The method of claim 1 wherein said first angle is from about 6° to about 18°.

3. The method of claim 2 wherein said first angle is from about 10° to about 15°.

4. The method of claim 2 wherein said second angle is from about 0° to about 10°.

5. The method of claim 4 wherein said second angle is about 0°.

6. The method of claim 2 wherein said second angle is from about 0° to about 10°.

7. The method of claim 6 wherein said second angle is from about 1° to about 5°.

* * * * *